United States Patent [19]

Inamoto et al.

[11] 4,161,851
[45] Jul. 24, 1979

[54] MOTOR VEHICLE WINDOW ASSEMBLY

[75] Inventors: Hiroshi Inamoto; Yoshinori Morita, both of Yokohama, Japan

[73] Assignee: Nissan Motor Company, Limited, Yokohama, Japan

[21] Appl. No.: 875,105

[22] Filed: Feb. 3, 1978

[30] Foreign Application Priority Data

Feb. 4, 1977 [JP] Japan ............................ 52-13068[U]

[51] Int. Cl.² ............................................. E06B 1/36
[52] U.S. Cl. ...................................... 52/208; 52/400
[58] Field of Search .................... 52/208, 627, 400; 296/84 R, 84 D, 90

[56] References Cited

U.S. PATENT DOCUMENTS

| | | | |
|---|---|---|---|
| 3,155,422 | 11/1964 | Campbell et al. | 52/208 X |
| 3,338,007 | 8/1967 | Draplin | 52/208 |
| 3,413,770 | 12/1968 | Adams | 52/208 |
| 3,714,751 | 2/1973 | Lackey | 52/208 |

Primary Examiner—J. Karl Bell
Attorney, Agent, or Firm—Schwartz, Jeffery, Schwaab, Mack, Blumenthal & Koch

[57] ABSTRACT

A motor vehicle window assembly comprises painted body panels having a side wall defining a window opening, and a glass pane for closing the window opening adhesively attached to the vehicle body panels. A spacer is adhesively attached to and extends continuously along all of the longitudinal length of the side wall. A molding is mounted to conceal a space between the edge of the glass pane and the side wall and has a depending flange portion engaging the spacer. The provision of the spacer prevents the molding from mechanically contacting with the painted vehicle body panel to thereby eliminate a possibility that the paint on the body panel adjacent the window opening is chipped or peeled off by the molding.

12 Claims, 9 Drawing Figures

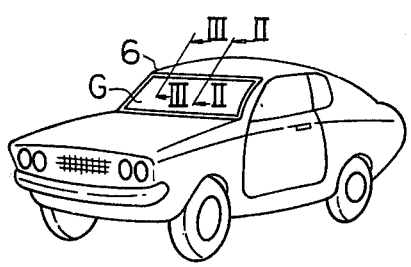
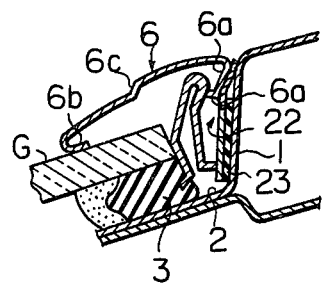
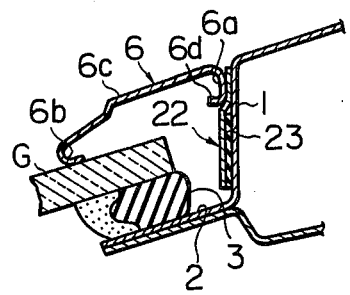
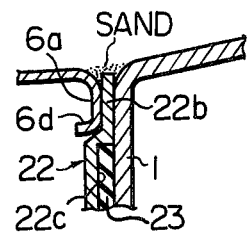
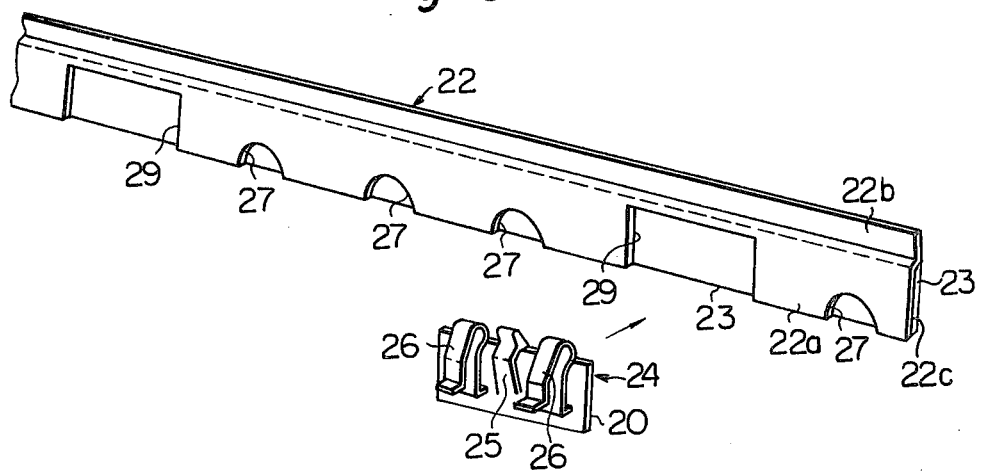

4,161,851

MOTOR VEHICLE WINDOW ASSEMBLY

BACKGROUND OF THE INVENTION

The present invention relates to a motor vehicle window assembly.

In a known motor vehicle window assembly, body panels have a side wall defining a window opening and a bottom wall projecting into the window opening and a glass pane is securely attached to the bottom wall with adhesive. A molding is mounted so as to conceal the perimeter on the outer side of the glass pane and a space between the edge of the glass pane and the side wall. The molding is mounted by means of a plurality of resilient clips securely attached to the side wall at spaced intervals. Each of the clips is attached to the side wall with a stud welded to the side wall. With this window assembly, there is a problem that a great number of spattered molten metal particles are deposited within an area adjacent to each stud on the side wall thereby making it very difficult to adequately paint the particle covered portions. Furthermore, even if the painting of the particle covered portions is achieved satisfactorily, the paint on the portions may be easily chipped or peeled off during the setting of spring clip members to studs since the surfaces of the subject portions are rough. These portions uncovered by the paint are easily rusted.

To solve this problem it is proposed to attach resilient clips to a side wall defining a window opening with a dual-sided adhesive tape.

A resilient clip formed with a spacer portion interposed between a molding and a side wall is known. A plurality of such clips are adhesively attached to the side wall at spaced intervals with their spacer portions engaged between the side wall and the molding. In this window assembly, there is a tendency that the molding may gnaw the side wall at portions where the clips are not present.

It is known for the purpose of preventing a molding from contacting with the side wall to securely cover an outer end portion of the molding with a strip of a soft resin or a rubber. In this window assembly, sand plugged between the strip and the side wall tends to chip or peel off the paint on the side wall because there occurs relative movement between the spacer secured to the molding and the side wall due to vibration during running of the motor vehicle.

SUMMARY OF THE INVENTION

It is an object of the present invention to provide a motor vehicle window assembly in which chipping or peeling-off of paint on body panels having a side wall defining a window opening is prevented.

BRIEF DESCRIPTION OF THE DRAWINGS

The present invention will be described hereinafter in connection with the accompanying drawings, in which:

FIG. 1 is a front perspective view of an automobile;

FIG. 2 is a sectional view taken through line II—II of FIG. 1;

FIG. 3 is another sectional view taken through line III—III of FIG. 1;

FIG. 4 is an enlarged view of a portion of FIG. 3;

FIG. 5 is a perspective view of one portion of a spacer according to the invention and a clip associated with the spacer;

DETAILED DESCRIPTION OF THE PREFERRED EMBODIMENTS

Figure 6:
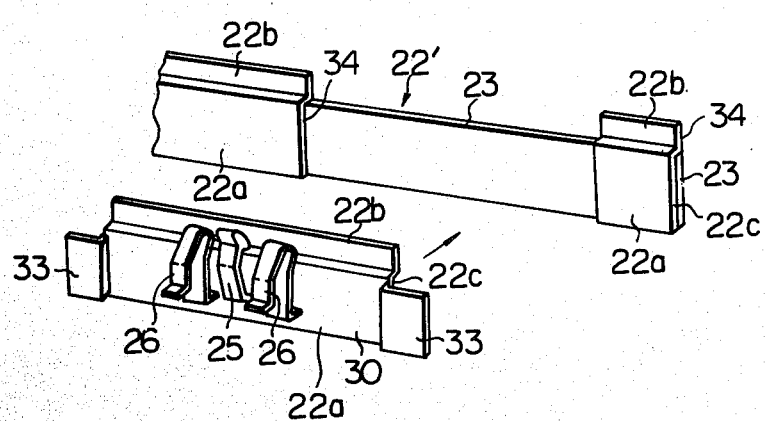
FIG. 6 is a similar view of a second embodiment of a spacer.

FIG. 1 shows an automobile which includes painted body panels having a window opening in which a glass pane G is mounted. The body panel has a side wall 1 (see FIGS. 2 and 3) defining the window opening and a bottom wall 2 projecting into the window opening. Adhesive means 3 mounts the glass pane G to the bottom wall 2. When mounted in the window opening, the glass pane G has a space between the edge thereof and the side wall 1.

The reference numeral 6 indicates a molding which conceals the perimeter on the outer side of the glass pane G and the space between the edge of the glass pane G and the side wall 1. The molding has a depending flange portion 6a engaging a spacer 22, a reversely bent end portion 6b engaging the perimeter on the outer side of the glass pane G and a trim portion 6c extending between the depending flange portion 6a and reversely bent end portion 6b to bridge the space. The depending flange portion 6a terminates in an inwardly bent end portion 6d. The spacer 22, which is preferably made of a plastic material, is adhesively attached to the side wall 1 with a dual-sided adhesive tape 23 and extends continuously along all of the longitudinal length of the side wall 1.

Referring to FIG. 5, the spacer 22 is cut out at 29 at spaced intervals or alternatively has openings at spaced intervals along its length. The spacer 22 includes a strip portion 22a formed with the openings 29 and a portion 22b which is offset to form a recess 22c for receiving the dual-sided adhesive tape 23. The spacer 22 also includes a plurality of clips, only one being shown at 24, each having a base plate portion 20 mounted in the corresponding one of the openings 29 and adhesively attached to the dual-sided adhesive tape 23. Each clip 24 has a resilient claw 25 engaging the molding 6 at the inwardly bent portion 6d and two resilient legs 26 engaging the edge of the glass pane G to be flexed to self-bias the base plate 20 toward the side wall 1, maintaining secure attachment of the base plate 20 to the dual-sided adhesive tape 23. Preferably a number of cut-outs or openings 27 are formed at spaced intervals along the length of the strip portion 22a so as to provide the spacer 22 with elasticity which allows the spacer 22 to conform the side wall 1.

The dual-sided adhesive tape 23 should be adhered to the recess 22c to close the openings 29 and then the corresponding number of clips should be mounted in the openings 29 respectively, before mounting in the window opening. In assembly, the spacer 22 is attached to the side wall 1 with the dual-sided adhesive tape 23 and the glass pane G is attached, in conventional manner, to the bottom wall 2 with the adhesive means 3, with the edge thereof engaged by the resilient legs 26 of the clips 24. Then the molding 6 is inserted into the window opening with the inwardly bent end portion 6d engaged by the claws 25 of the clips 24 and the depending flange portion 6a engaging the spacer portion 22b of the spacer 22.

Since the depending flange portion 6a of the molding 6 is not in contact with the body panel, the problem encountered in the prior art motor vehicle window assembly that the paint on the body panels tends to be peeled off or chipped is solved according to the invention.

Even if there is appreciable relative movement between a molding and the vehicle body panels upon twisting of the vehicle body during running of the vehicle, sand, if plugged between the depending flange portion 6a of the molding 6 and the spacer 22 (see FIG. 4), will not chip nor peel off the paint. Therefore, rusting of the vehicle body panels around the window opening is prevented according to the invention.

A spacer 22' shown in FIG. 6 is divided into and consists of a plurality of first parts 30, each having an integral clip formed with a claw 25 and two resilient legs 26, and two offset flanges 33 at both longitudinal ends thereof, and a plurality of second parts 34. Each of the first and second parts 30 and 34 is formed with a strip portion 22a, an offset portion 22b and a recess 22c similarly to the spacer 22 shown in FIGS. 1 to 5. In assembly, the second parts 34 are arranged at spaced intervals and adhered to a dual-sided adhesive tape 23 and each of the first parts 30 is arranged between the adjacent two of the second parts 34 with its offset flanges 33 overlying the longitudinal end portion of the adjacent two second parts 34 and adhered to the dual-sided adhesive tape 23.

Figure 7:
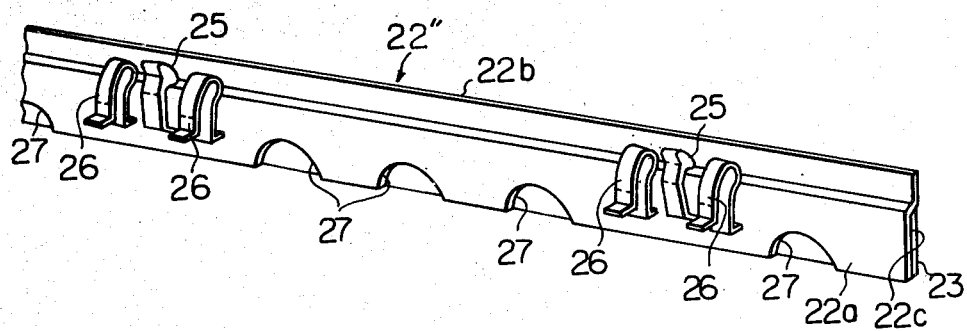
FIG. 7 is a similar view of a third embodiment of a spacer.

FIG. 7 shows a spacer 22" having a plurality of clips, each having a claw 25 and two resilient legs 26, integrally formed therewith at spaced intervals along the length thereof.

Figure 8:
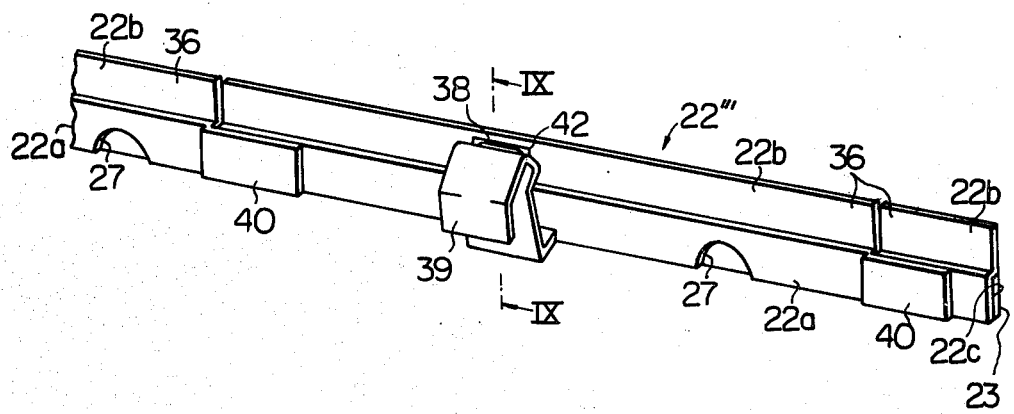
FIG. 8 is a similar view of fourth embodiment of a spacer.
Figure 9:
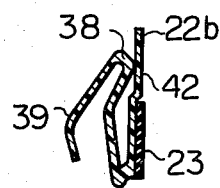
FIG. 9 is a sectional view taken through line IX—IX of FIG. 8.

Referring to FIGS. 8 and 9, a spacer 22''' is divided into and consists of a plurality of parts 36, each having at least one clip having a claw 38 and an integral resilient leg 39 and having an offset flange 40 at one longitudinal end thereof. The plurality of parts 36 are adhesively attached to a dual-sided adhesive tape 23 with the offset flange 40 of one of the parts 36 overlying an opposite longitudinal end portion of the adjacent one of the parts 36. As best seen in FIG. 9, when in the free state the claw 38 is curved into a slot 42 so that when in the mounting state the claw is flexed in order to be self-biased to increase the force to engage molding 9 (see FIG. 2).

What is claimed is:

1. A motor vehicle window assembly comprising:
    painted body panels having a side wall defining a window opening and a bottom wall projecting into said window opening;
    a glass pane for closing said window opening and when mounted therein having a space between the edge of said glass pane and said side wall;
    adhesive means for mounting said glass pane to said bottom wall;
    a spacer adhesively attached to and extending continuously along all of the length of said side wall; and
    molding having a depending flange portion engaging said spacer, an end portion engaging the perimeter on the outer side of said glass pane and a trim portion extending between said depending flange portion and said end portion to bridge said space;
    said spacer having a portion extending between said side wall and said molding to prevent contact and mutual abrasion between said molding and said side wall and to prevent accumulation of abrasive particles between said side wall and said molding.

2. A motor vehicle window assembly as claimed in claim 1, in which said spacer has resilient clips at spaced intervals along the length thereof each clip having a claw engaging said molding.

3. A motor vehicle window assembly as claimed in claim 2, in which said spacer has said clips integrally formed thereon.

4. A motor vehicle window assembly as claimed in claim 1, in which said spacer comprises:
    a plurality of openings at spaced intervals along its length;
    a strip portion formed with said plurality of openings;
    a dual-sided adhesive tape attached to said strip portion to close said plurality of openings;
    a plurality of clips mounted in said openings, respectively and attached to said dual-sided adhesive tape.

5. A motor vehicle window assembly as claimed in claim 1, in which said spacer comprises a plurality first parts, each having at least one clip having a claw engaging said molding and a plurality of second parts.

6. In a motor vehicle body as claimed in claim 1, in which said spacer comprises a plurality of parts, each having an integral clip formed with a claw engaging said molding and an offset flange at one longitudinal end thereof, and a dual-sided adhesive tape, said plurality of parts being adhesively attached to said dual-sided adhesive tape one after another with the flange of one of said sections overlying an opposite end portion of the adjacent one of said sections.

7. A motor vehicle window assembly comprising:
    painted body panels having a side wall defining a window opening and a bottom wall projecting into said window opening;
    a glass pane for closing said window opening and when mounted therein having a space between the edge of said glass pane and said side wall;
    adhesive means for mounting said glass panel to said bottom wall;
    a spacer adhesively attached to and extending continuously along all of the length of said side wall; and
    molding having a depending flange portion engaging said spacer, an end portion engaging the perimeter on the outer side of said glass pane and a trim portion extending between said depending flange portion and said end portion to bridge said space; said spacer comprising:
    a strip portion formed with a plurality of openings at spaced intervals along its length; a dual-sided adhesive tape attached to said strip portion to close said plurality of openings; and
    a plurality of clips for engaging said depending flange portion, one of said clips being mounted in each of said openings and attached to said dual-sided adhesive tape.

8. A motor vehicle window assembly comprising:
    painted body panels having a side wall defining a window opening and a bottom wall projecting into said window opening;
    a glass pane for closing said window opening and when mounted therein having a space between the edge of said glass pane and said side wall;
    adhesive means for mounting said glass pane to said bottom wall;
    a spacer adhesively attached to and extending continuously along all of the length of said side wall; and molding having a depending flange portion engaging said spacer, an end portion engaging the perimeter on the outer side of said glass pane and a trim portion extending between said depending flange portion and said end portion to bridge said space;

said spacer comprising a plurality of parts, each part having an integral clip formed with a claw engaging said molding and an offset flange at one longitudinal end thereof, and a dual-sided adhesive tape, said plurality of parts being adhesively attached to said dual-sided adhesive tape one after another with the flange of one of said sections overlying an opposite end portion of the adjacent one of said sections.

9. A motor vehicle window assembly as claimed in claim 5, wherein each of said first parts includes an offset flange at each end thereof, which flanges are adapted to overlap the end portions of two second parts adjacent to each of said first parts.

10. A motor vehicle window assembly as claimed in claim 2, wherein said clips comprise at least one resilient leg adapted to engage the edge of said glass pane to urge said clip toward said side wall.

11. A motor vehicle window assembly as claimed in claim 2, wherein said spacer includes a first recess in its side opposite to the side having said clips, for receiving a dual-sided adhesive tape as means for adhesively attaching said spacer to said side wall.

12. A motor vehicle window assembly as claimed in claim 11, wherein said spacer comprises a staggered cross-section, forming said first recess at the bottom side of said spacer and a corresponding second recess at the top side of said spacer on the side opposite said first recess, and wherein said claw is normally biased into said second recess.

* * * * *